May 13, 1930.   E. G. K. ANDERSON   1,758,387
MEANS FOR FASTENING ELEMENTS TO WALLS
Filed Nov. 22, 1926
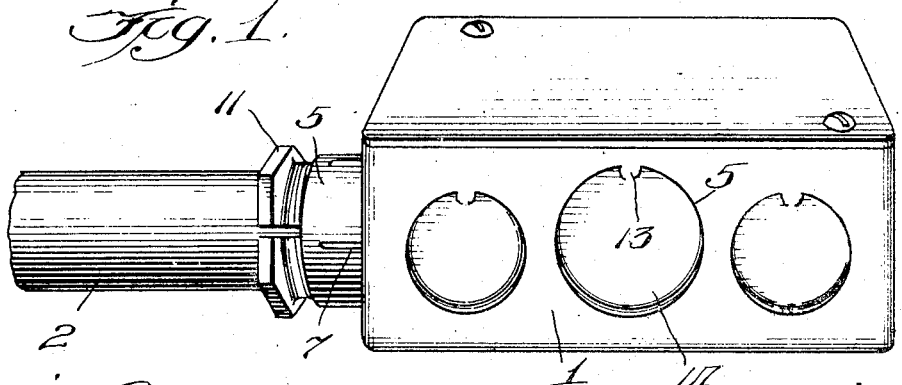
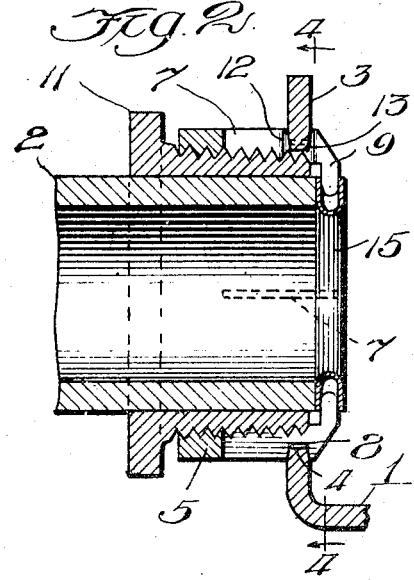
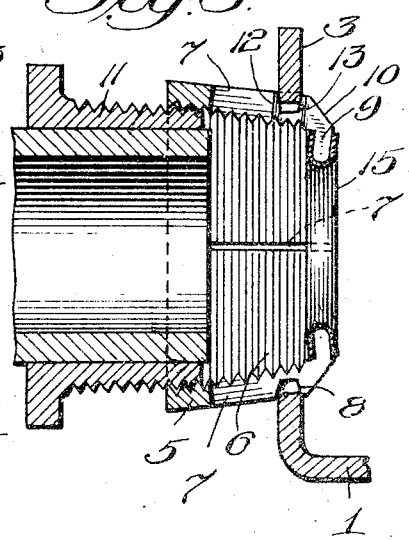
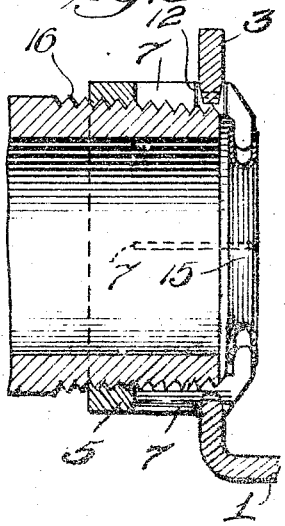
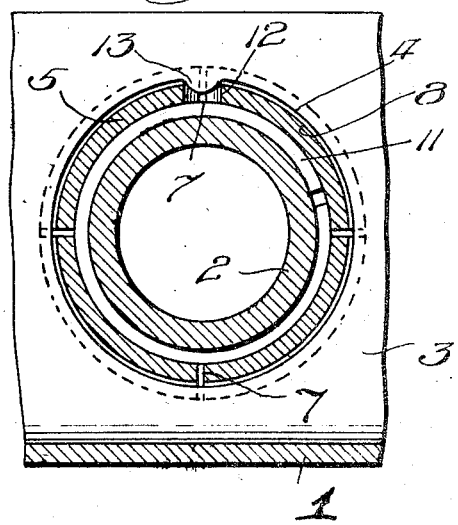
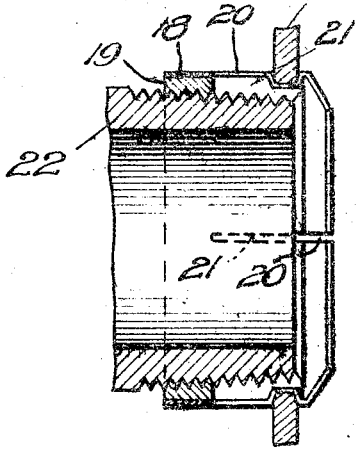
Inventor:
E. G. K. Anderson,
By Wm. F. Frederich,
Atty.

Patented May 13, 1930

1,758,387

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

MEANS FOR FASTENING ELEMENTS TO WALLS

Application filed November 22, 1926. Serial No. 150,136.

The present invention relates particularly to means for securely fastening a conduit, pipe, rod or cable to a wall, as for example, the wall of an electrical connection box; and it has for its object to produce a simple and novel connecting means that will securely fasten the wall and the other element together and, in the event that good electrical conductive contact is required between the two elements, insure such contact.

Some pipes, conduits or other elements with which the present invention is concerned are externally screw-threaded, while others are plain. A further object of the present invention is to produce a simple and novel connecting means that is suitable for use in fastening to a wall an externally screw-threaded element or an element of smaller diameter that is not screw-threaded.

The various features of novelty whereby my invention is characterized will hereinafter be poitned out with particularity in the claims; but, for a full understanding of my invention and of its objects and advantages, reference may be had to the following detailed description taken in connection with the accompanying drawing, wherein:

Figure 1 is a perspective view of an electrical connection box having a threadless pipe secured thereto in accordance with the present invention; Fig. 2 is a longitudinal section, on a larger scale than Fig. 1 through the end of the pipe and adjacent portion of the wall of the box, and through the fastening means between the same; Fig. 3 is a view similar to Fig. 2, showing the condition of the parts during the act of assembling together; Fig. 4 is a section taken on line 4—4 of Fig. 2; Fig. 5 is a view similar to Fig. 2, illustrating the attachment of an externally-threaded pipe of larger diameter than the pipe in Fig. 2; and Fig. 6 is a view similar to Figs. 2 and 5 showing a modification.

In the drawings I have illustrated my invention as embodied in means for fastening a pipe to an outlet box and, for the sake of brevity, the detailed description will be confined to this particular embodiment; although it will of course be understood that the pipe is simply illustrative of a type of element, and the wall of the connection box is simply representative of walls in general.

Referring to Figs. 1 to 3 of the drawing, 1 represents an outlet box and 2 a threadless pipe to be fastened thereto. In a wall 3 of the box is a round hole 4 larger in diameter than the pipe. I provide a sleeve 5, frustoconical in shape and provided with internal screw-threads as indicated at 6. The smaller end of the sleeve is of about the same diameter as, and it may be slightly greater in diameter than, the hole in the outlet box. The sleeve is slitted at points distributed circumferentially thereof, from the smaller end to within a short distance of the large end as indicated at 7, so that the major portion of the sleeve may expand and contract in radial directions. In the periphery of the sleeve, near the small end, is a circumferential groove 8 having a width about equal to the thickness of the wall of the box at the mouth and, if desired, being slightly narrower near the bottom. The small end of the sleeve preferably terminates in an inturned flange 9, the outer face of which, at the juncture with the peripheral surface of the sleeve is sharply inclined as indicated at 10.

If the smaller end of the sleeve is slightly larger in diameter than the hole in the box, the sleeve may be pressed into the hole, being contracted slightly through the engagement of the inclined or beveled edge 10 with the boundary of the hole; thus permitting the sleeve to be entered into the hole far enough to bring the groove into the plane of the wall, and permitting the sleeve to expand slightly and temporarily hold the sleeve in place. If it be desired to make the small end of the sleeve slightly smaller in diameter than the hole, it becomes unnecessary to spring the sleeve into place, and the beveled edge 10 simply forms a finish on the inner side of the wall, whereby sharp corners are avoided.

The internal diameter of the sleeve is larger than the external diameter of the pipe, so that there may be screwed into the sleeve a split bushing 11 surrounding and loose on the pipe.

In assembling the parts, the bushing is slipped on the pipe and the latter is then pushed into the sleeve as far as it will go. In Fig. 3 the pipe is shown as only partly pushed into the sleeve, whereas Fig. 2 shows the final position of the pipe, the end abutting against the flange 9. After the pipe has been properly positioned, the bushing is screwed into the sleeve, expanding the slitted portion of the latter so as firmly to seat the edges of the wall of the box around the hole into the groove. If the groove is narrowed somewhat toward the bottom, the edges of the wall will be wedged in place; but in any event, a perfect metal to metal contact will be insured. Since the sleeve 11 is split, as best shown in Figs. 1 and 4, it will be caused to grip the pipe as it is screwed in. In other words, the radial thrust between the sleeve and the bushing, as the bushing is screwed in, results partly in expanding the sleeve and partly in contracting the bushing, so that when the bushing has been screwed in as far as it will go, the pipe and the wall of the box are rigidly locked together and a good electrical conductive path is provided between the pipe and the wall of the box.

When the bushing is screwed into the sleeve, the latter will rotate unless restrained. I therefore have provided the sleeve with a hole 12 at the intersection of one of the slits with the groove. This hole is adapted to receive a projection on the wall of the box. This projection may be a simple tongue 13 left projecting into the hole 5 when the knockout piece 14, as indicated in Fig. 1, is removed. Such tongues now remain in connection boxes, after the removal of the knockout pieces but, as they are more or less rudimentary, the design may be slightly changed in manufacturing these boxes, so as to insure tongues of sufficient length to project below the bottom of the groove in the sleeve when the sleeve is first placed in the hole in the box. When placing the sleeve in position, the hole 12 is brought into registration with the tongue 13, so that this tongue snaps into the hole and thereafter prevents rotation of the sleeve.

The slits through the small end of the sleeve and its flange leave sharp corners that may catch on cables or other elements passing through the pipe into the box. In order to cover the sharp corners and provide a smooth, continuous rounded edge over which elements extending through the pipe into the box may pass, I insert a sheet metal eyelet 15 into the small end of the sleeve, the trough in the eyelet receiving the inner marginal portion of the flange. The trough in the eyelet is made deep enough so that the eyelet will not become disengaged from the flange when the sleeve is fully expanded as shown in Fig. 2.

When an externally-threaded pipe is to be fastened to the box, the threaded portion of the pipe, as indicated at 16 in Fig. 5, takes the place of the bushing heretofore described; the pipe being simply screwed into the sleeve and expanding the latter in the same way as is done by the bushing when the bushing is used. It will be seen that the screw-threaded pipe must be one of larger diameter than the threadless pipe with which the bushing is employed. Therefore, for the sake of interchangeability, the parts are preferably so designed that the same sleeve may be used for fastening a standard threadless pipe of one size and a standard screw-threaded pipe of a predetermined larger size.

In Fig. 6 I have illustrated an arrangement in which the sleeve is made of two parts, namely a pressed or spun sheet metal shell 18 surrounding an internally screw-threaded shell 19; both of these shells being slitted, as indicated at 20 and 21 respectively, to correspond with the slitting of the sleeve 11 in the other form. While, for the sake of clearance, the slits 20 and 21 are shown as registering with each other in the drawing, they may be angularly displaced with respect to each other so that each slit in each of the shells will be covered by an unslitted part of the other shell; thus avoiding the entrance of dirt, gases, liquid or other foreign matter into the box through the slits. The two shells need not be fastened together, and therefore they may be properly located in any desired relative positions. The externally screw-threaded part 22 may be either a bushing or an externally-threaded pipe, since this compound sleeve may be used in either of the two ways for which the sleeve 5 in the other form is adapted.

It will be seen that my improved fastening permits either a threaded or a plain pipe or other element to be rigidly fastened to a thin wall through or into which it projects, without requiring the wall to be made with a boss or socket deep enough to provide a threaded connection. Therefore a pipe or the like may be securely fastened, in good electrically conductive relation, to the wall of a simple sheet metal connection box or the like.

While I have illustrated and described with particularity only a single preferred form of my invention, with a single modification, I do not desire to be limited to the exact structural details thus illustrated and described; but intend to cover all forms and arrangements which come within the definitions of my invention constituting the appended claim.

I claim:

In combination, a sleeve flanged inwardly at one end and provided with a circumferential groove near said end, the flange and a portion of the sleeve inwardly therefrom being slit to permit radial expansion, and a ring U-shaped in cross-section arranged in the opening bounded by the flange and having its wings extending past the inner and outer faces of the flange.

In testimony whereof, I sign this specification.

ERNST G. K. ANDERSON.